Figure 1:
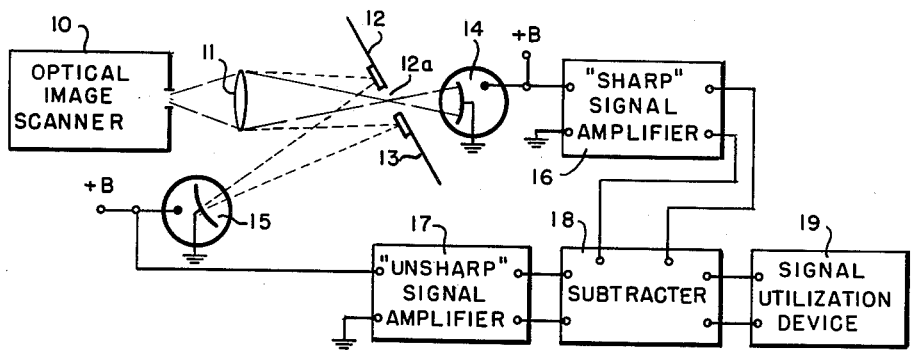

3,017,515
PHOTOELECTRIC UNSHARP-MASKING
APPARATUS
Albert B. Welch, Dallas, Tex., assignor to Fairchild Camera and Instrument Corporation, a corporation of Delaware
Filed Oct. 26, 1959, Ser. No. 848,736
5 Claims. (Cl. 250—209)

This invention relates to photoelectric unsharp-masking apparatus for use in an electro-optical object-scanning system for developing an image-representative signal with sharpened boundaries.

The use of unsharp masking in photographic processes to sharpen or crispen boundaries in a reproduced image is well known in the art, being described in United States Letters Patent No. 2,455,849 to Yule. The term "unsharp masking" is used herein in the same sense as in the Yule patent, namely, the use of image-representative information developed through an unsharp aperture or equivalent defocusing arrangement to modify image-representative information developed through a sharp aperture or equivalent in-focus arrangement. An application of analogous techniques to photoelectric reproducing systems is described and claimed in the copending application of Monroe Farber, Serial No. 845,451, filed October 9, 1959, now Patent No. 2,972,012 and assigned to the same assignee as the instant application. The present invention represents an improvement upon, and simplification of, the photoelectric unsharp-masking apparatus included in the system described in said copending application.

It is an object of the present invention, therefore, to provide a new and improved photoelectric unsharp-masking apparatus of maximum simplicity and yet capable of producing a marked sharpening of the boundaries in a reproduced image.

In accordance with the invention, in an electro-optical object-scanning system including optical means for developing a light beam representative of the luminance of successive elemental areas of an object, there is provided a photoelectric unsharp-masking apparatus for deriving an image-representative signal with sharpened boundaries comprising a member having an aperture disposed in the focal plane of the optical means of the system for developing from the object light beam a sharp light beam, an optical element coplanar with the apertured member and surrounding the aperture for developing from the object light beam an unsharp light beam, a pair of photoelectric devices individually exposed to the sharp beam and the unsharp beam for developing signals representative thereof, and means for differentially combining the developed signals to develop an output signal.

For a better understanding of the present invention, together with other and further objects thereof, reference is had to the following description taken in connection with the accompanying drawing, while its scope will be pointed out in the appended claims.

Figure 2:
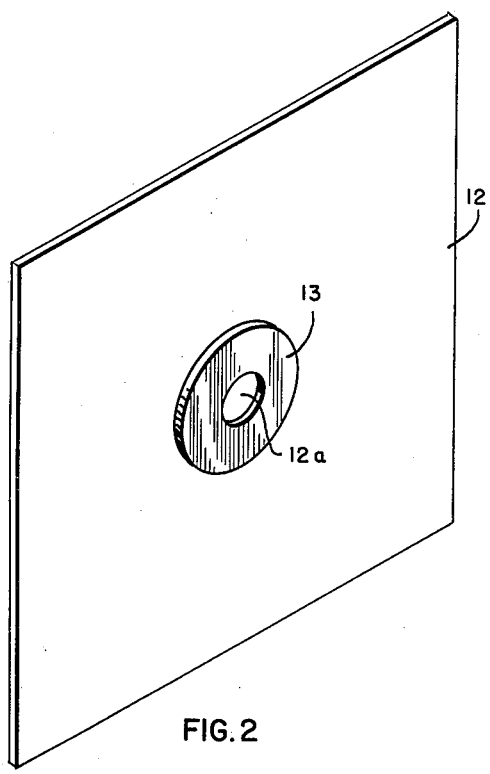

Referring now to the drawing:

FIG. 1 is a schematic representation of a photoelectric unsharp-masking apparatus embodying the invention; while FIG. 2 is a detailed view in perspective of the optical aperture plate included in the system of FIG. 1.

Referring now more particularly to the drawing, there is represented an electro-optical object-scanning system including optical means for developing a light beam representative of the luminance of successive elemental areas of an object. This means may comprise an optical image scanner 10 of any well-known type, for example, that described in United States Letters Patent No. Re. 23,914 to Boyajean, for developing a single light beam and focusing it upon an objective lens 11. The system of FIG. 1 also comprises a photoelectric apparatus for deriving from the light beam developed by the scanner 10 an image-representative signal with sharpened boundaries. This apparatus includes an aperture member such as a plate 12 having an aperture 12a disposed in the focal plane of the objective lens 11. As illustrated, the plate 12 is inclined somewhat with respect to the optical axis of the lens 11. The aperture 12a constitutes a light-transmitting optical aperture and is effective to develop from the light beam developed by the scanner 10 a sharp light beam representative of the brightness of successive scanned elemental areas of the original object or copy.

The unsharp-masking apparatus of FIG. 1 also comprises an optical element surrounding the aperture 12a for developing from the same light beam from the scanner 10 an unsharp light beam, representing the brightness of the areas immediately surrounding the successive elemental areas of the scanned object represented by the sharp light beam. This optical element may be in the form of an annular mirror 13 disposed on the plate 12 and surrounding the aperture thereof, as shown more clearly in FIG. 2. The annular mirror 13 constitutes a light-reflecting optical aperture and is effective to develop from the object light beam the desired unsharp light beam. The apparatus further includes a pair of photoelectric devices such as a photo-tube 14 exposed to the sharp light beam passing through the aperture 12a and a photo-tube 15 exposed to the unsharp beam reflected from the annular mirror 13. The photo-tubes 14 and 15 may be of any conventional type, preferably photomultiplier tubes as illustrated and described in detail in the aforesaid copending Farber application.

The unsharp-masking apparatus further includes means for differentially combining the signals developed by the photo-tubes 14 and 15 to develop an output signal. This means may comprise a "sharp" signal amplifier 16 and an "unsharp" signal amplifier 17, the outputs of which are differentially combined in a subtracter circuit 18, the output of which is supplied to a signal utilization device 19 which may, for example, be in the form of an engraving or cutting head of a photoelectric engraving machine of the type described in the aforesaid Reissue Patent No. 23,914. It will be understood that the amplifiers 16 and 17 also may be conventional in form and may, if desired, include gain-adjusting means for adjusting the relative amounts of the "sharp" signal and "unsharp" signal applied to the subtracter circuit 18. The unit 18 may be a conventional subtracting circuit, for example, one of the type described in the aforesaid copending Farber application.

Considering now the operation of the unsharp-masking apparatus of the invention described above, the general principles involved in sharpening the boundaries of an image reproduced by a photoelectric reproducing apparatus are explained in detail in German Patent No. 1,039,842 to Rudolf Hell, particularly with reference to FIGS. 1–4, inclusive, thereof and need not be repeated here. The present invention comprises a simplified and improved apparatus for applying the basic principles described in the Hell patent to develop an image-representative signal with sharpened boundaries. Further, the operation of the subtracter circuit 18 in modifying the "sharp" signal output of the unit 16 by the "unsharp" signal output of the unit 17 is described in detail in the aforesaid copending Farber application. In brief, when the scanning beam of the scanner 10 is passing from an elemental area of higher luminance to one of lower luminance, the magnitude of the signal output of the subtracter 18 is momentarily increased just before the sharp scanning beam reaches the boundary between such two areas and is decreased just as it passes such boundary. The reverse is true when the scanning beam is passing from an elemental area of lower luminance to one of higher luminance. The result is effectively to increase the luminance gradient of a reproduced image at each boundary between areas of substantially different luminance so that the reproduced image appears to have sharpened boundaries. However, when the scanner 10 is scanning a large area of uniform luminance, the wave form of the "unsharp" signal is similar to that of the "sharp" signal and there is no modification or distortion of the normal sharp signal.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an electro-optical object-scanning system including optical means for developing a light beam representative of the luminance of successive elemental areas of an object, a photoelectric unsharp-masking apparatus for deriving an image-representative signal with sharpened boundaries comprising: a member having an aperture disposed in the focal plane of said optical means for developing from said object light beam a sharp light beam; an optical element coplanar with said member and surrounding said aperture for developing from said object light beam an unsharp light beam; a pair of photoelectric devices individually exposed to said sharp beam and said unsharp beam for developing signals representative thereof; and means for differentially combining said signals to develop an output signal.

2. In an electro-optical object-scanning system including optical means for developing a light beam representative of the luminance of successive elemental areas of an object, a photoelectric unsharp-masking apparatus for deriving an image-representative signal with sharpened boundaries comprising: a plate having an aperture disposed in the focal plane of said optical means for developing from said object light beam a sharp light beam; an annular optical element disposed on said plate surrounding said aperture for developing from said object light beam an unsharp light beam; a pair of photoelectric devices individually exposed to said sharp beam and said unsharp beam for developing signals representative thereof; and means for differentially combining said signals to develop an output signal.

3. In an electro-optical object-scanning system including optical means for developing a light beam representative of the luminance of successive elemental areas of an object, a photoelectric unsharp-masking apparatus for deriving an image-representative signal with sharpened boundaries comprising: a plate having an aperture disposed in the focal plane of said optical means and inclined with respect to the axis thereof for developing from said object light beam a sharp light beam; an annular mirror disposed on said plate and surrounding the aperture thereof for developing from said object light beam an unsharp light beam; a pair of photoelectric devices individually exposed to said sharp beam and said unsharp beam for developing signals representative thereof; and means for differentially combining said signals to develop an output signal.

4. In an electro-optical object-scanning system including optical means for developing a light beam representative of the luminance of successive elemental areas of an object, a photoelectric unsharp-masking apparatus for deriving an image-representative signal with sharpened boundaries comprising: a member disposed in the focal plane of said optical means and having two concentric coplanar optical apertures, one of said apertures being light-transmitting and the other being light-reflecting; the inner one of said apertures being effective to develop from said object light beam a sharp light beam and the outer one of said apertuers being effective to develop from said object light beam an unsharp light beam; a pair of photoelectric devices individually exposed to said sharp beam and said unsharp beam for developing signals representative thereof; and means for differentially combining said signals to develop an output signal.

5. In an electro-optical object-scanning system including optical means for developing a light beam representative of the luminance of successive elemental areas of an object, a photoelectric unsharp-masking apparatus for deriving an image-representative signal with sharpened boundaries comprising: a member disposed in the focal plane of said optical means and having two concentric coplanar optical apertures, the inner one of said apertures being light-transmitting and effective to develop from said object light beam a sharp light beam and the outer one of said apertures being light-reflecting and effective to develop from said object light beam an unsharp light beam; a pair of photoelectric devices individually exposed to said sharp beam and said unsharp beam for developing signals representative thereof; and means for differentially combining said signals to develop an output signal.

References Cited in the file of this patent

UNITED STATES PATENTS

| | | |
|---|---|---|
| 1,812,765 | Astafiev | June 30, 1931 |
| 2,803,752 | Warren | Aug. 20, 1957 |